United States Patent [19]

Toulmay

[11] Patent Number: 4,662,174
[45] Date of Patent: May 5, 1987

[54] PLUME DILUTER DIVERTER ASSEMBLY FOR A TURBINE ENGINE OF A HEAVIER THAN AIR MACHINE

[75] Inventor: Francois V. Toulmay, Vitrolles, France

[73] Assignee: Societe Nationale Industrielle et Aerospatiale, Paris, France

[21] Appl. No.: 740,783

[22] Filed: Jun. 3, 1985

[30] Foreign Application Priority Data

Jun. 4, 1984 [FR] France ................. 84 08709

[51] Int. Cl.⁴ .............................................. F02K 3/04
[52] U.S. Cl. ........................................ 60/264; 60/271;
60/39.5; 239/265.17; 239/265.19
[58] Field of Search ................. 60/264, 266, 269, 271,
60/232, 230, 228, 39.5; 239/265.17, 265.19,
265.37, 265.35, 265.33, 127.3; 181/215, 216,
222, 220

[56] References Cited

U.S. PATENT DOCUMENTS

| | | | |
|---|---|---|---|
| 3,053,477 | 9/1962 | Reiniger | 60/232 |
| 3,067,579 | 12/1962 | Olbrich | 60/232 |
| 3,279,192 | 10/1966 | Hull, Jr. et al. | 60/264 |
| 3,979,065 | 9/1976 | Madden | 60/271 |
| 3,989,193 | 11/1976 | Vedova et al. | 239/265.35 |
| 4,007,587 | 2/1977 | Banthin et al. | |
| 4,018,046 | 4/1977 | Hurley | |
| 4,215,537 | 8/1980 | Hurley | |
| 4,312,480 | 1/1982 | Miller | 60/264 |
| 4,316,721 | 2/1982 | Weiss et al. | 239/265.19 |
| 4,369,937 | 1/1983 | LeBell et al. | |
| 4,544,098 | 10/1985 | Warburton | 239/127.3 |

FOREIGN PATENT DOCUMENTS

| | | |
|---|---|---|
| 3129305 | 2/1983 | Fed. Rep. of Germany |
| 1144879 | 10/1957 | France |
| 2293363 | 7/1976 | France |
| 2508412 | 12/1982 | France |
| 2515735 | 5/1983 | France |

Primary Examiner—Louis J. Casaregola
Assistant Examiner—Donald E. Stout
Attorney, Agent, or Firm—Armstrong, Nikaido, Marmelstein & Kubovcik

[57] ABSTRACT

The assembly comprises a collector nozzle which is fixed to a turbine engine and which is elbowed laterally towards the exterior and which debouches into injection nozzles which are also elbowed and which open into a mixer masked laterally by means of a fairing, of which a shaped forward section defines, with an internal shaped screen and a central plug, a semi dynamic principal air inlet. The aspirated air dilutes the gas in the mixer which is terminated by means of an elbow directed upwardly and which can pivot about a transverse axis. In the position of maximum deviation upwardly this elbow masks the hot parts of the assembly from the rear. The assembly is particularly useful for equipping helicopters with lateral exhaust gas turbine engines, and it can be original equipment or retrofitted. The assembly serves to reduce the infra red emission from the helicopter, to defeat infra red homing missiles.

14 Claims, 4 Drawing Figures

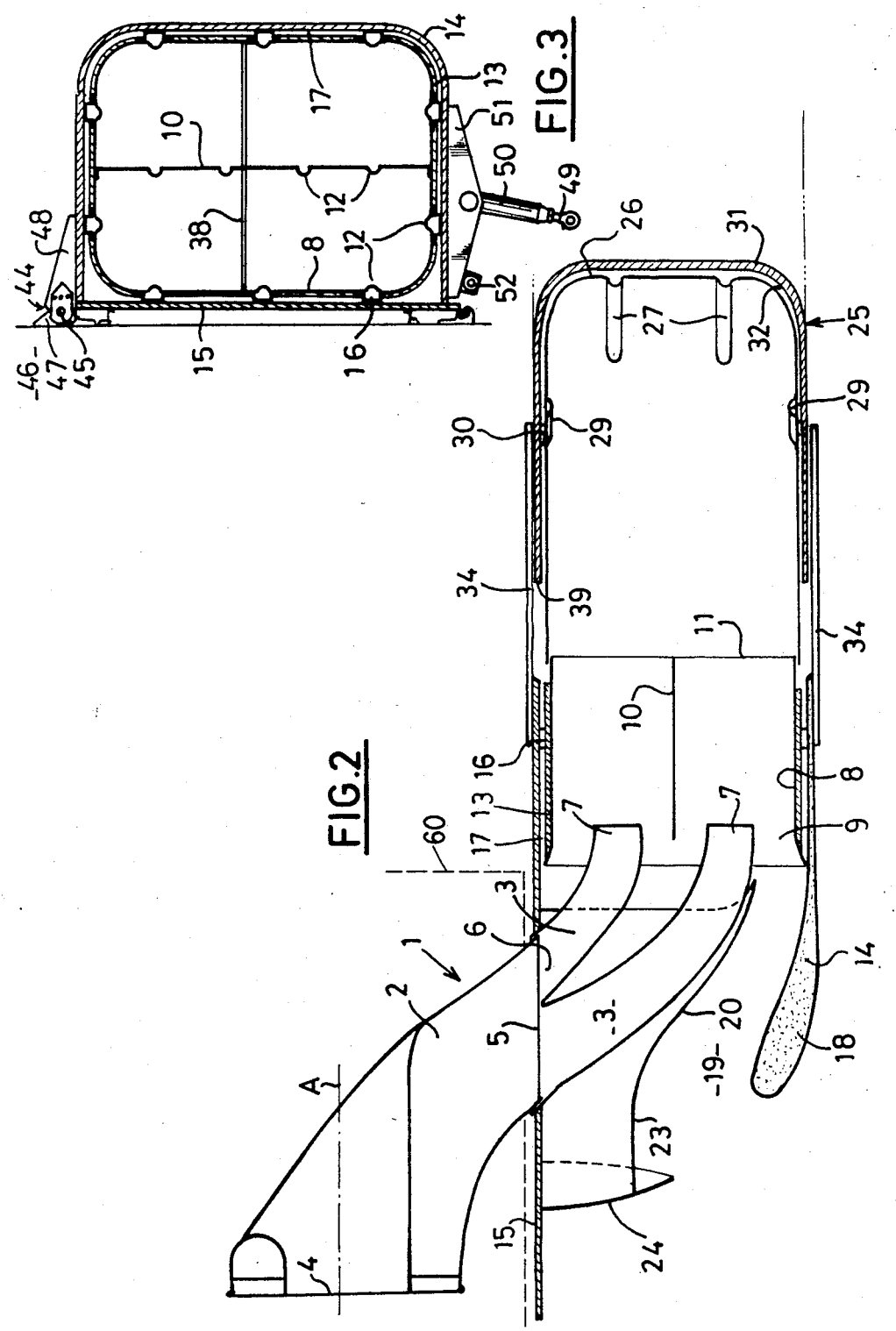

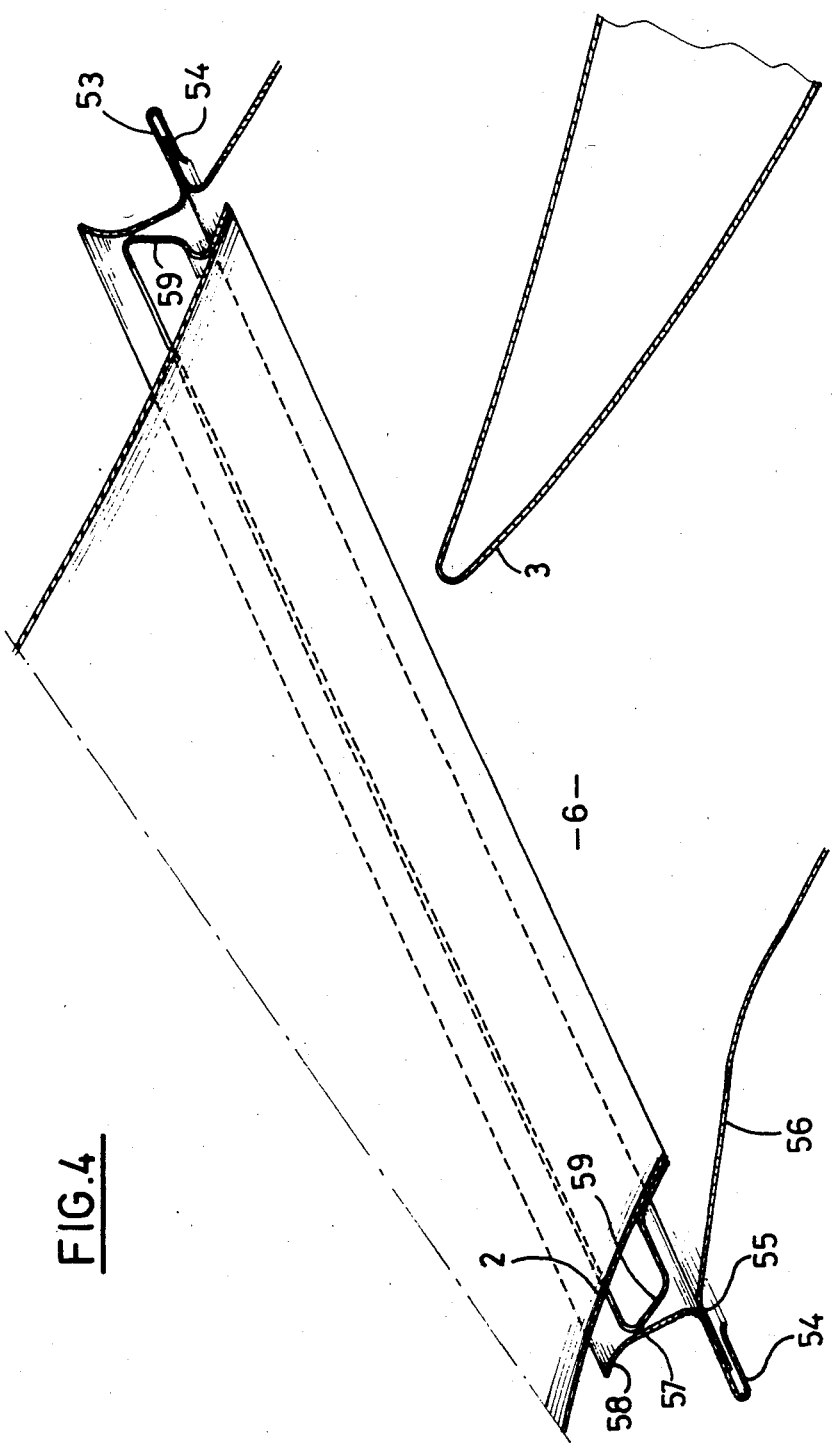

PLUME DILUTER DIVERTER ASSEMBLY FOR A TURBINE ENGINE OF A HEAVIER THAN AIR MACHINE

FIELD OF THE INVENTION

The present invention relates to an assembly for diluting and diverting the exhaust plume from a turbine engine of a heavier than air machine, and it is more particularly concerned with such an assembly which is for use with a gas turbine helicopter engine with lateral exhaust and which is located in front of the main transmission box of the helicopter in a casing which constitutes an integral part of the fuselage.

BACKGROUND TO THE INVENTION

It is known that missiles with seeker heads provided with infra red radiation detectors constitute a danger to military heavier than air machines, particularly to aircraft and helicopters provided with gas turbine engines, since the hot metallic members which these heavier than air machines have downstream of their turbine engine(s), and which are either the rear parts of these engines such as their outlet nozzle, or are metallic parts which are swept over and heated up by the hot plume of exhaust gas from the turbine engine, as well as the hot exhaust gas plume itself, constitute substantial sources of infra red radiation emission.

For this reason, it has already been proposed to suppress, or at least to reduce or attenuate to the greatest extent possible, though simultaneously without detracting too much from the operation or performance of the gas turbine engine, the infra red emission from these hot metallic parts and the plume of hot gas, on the one hand by masking the hot parts from the "view" of the missile, whatever the relative position of the missile relative to the heavier than air machine, and on the other hand by ensuring dilution of the hot exhaust gas plume with fresh ambient air, with the object of lowering its temperature sufficiently.

DESCRIPTION OF PRIOR ART

U.S. Pat. No. 3,981,143 describes infra red emission suppression apparatus formed in the exhaust gas nozzle which comprises a plug mounted coaxially in the nozzle or casing in such a fashion as to define with it an engine exhaust duct of tortuous configuration, this configuration forbidding the inlet of the exhaust duct to be seen from its exit with the object of avoiding any infra red radiation directly to rearward, while means are provided for cooling parts at least of the exhaust duct casing and of the plug, which means comprise in combination a blower mounted coaxially on the rear end of the shaft of the gas turbine engine and which is driven into rotation by the hot gas flow emerging from the turbine engine, this blower having circumferentially disposed blades which turn around the axis of the turbine engine, a blower inlet plenum providing for a reduction of inlet air turbulence and for the equal distribution of the inlet air to the annular blower, substantially radial passages for feeding the blower inlet plenum with fresh ambient air, an outlet duct from the blower, a blower outlet cone mounted coaxially in the outlet duct with the object of forming an annular blower air outlet diffuser duct and a blower outflow stream splitter ring, this ring being located in the outlet diffuser channel with the object of splitting the flow of blown air and of directing part towards the wall of the plug in order to cool the latter while the other part is directed towards the exhaust duct casing to cool it.

Such a construction, which is only well adapted for building into a gas turbine engine with axial exhaust or at least longitudinal exhaust, has the disadvantage of including a component, the blower, which is constantly moving when it is operating and this is accordingly an approach which calls for delicate and complex mounting and dynamic balancing, which has as a result that this component is much more susceptible to failure than a fixed element.

U.S. Pat. No. 4,018,046 likewise describes an infra red radiation suppressor for a gas turbine engine, particularly for a helicopter. This arrangement comprises an ejector assembly with fixed though adjustable vanes and a diverter for the exhaust plume in the form of a convergent divergent dog-leg duct. The ejector assembly comprises several radial vanes in the form of a "V" with corrugated lateral wings which are spread circumferentially at the end of a turbine outlet nozzle and which provide the introduction of ambient cooling and diluting air in the plume of hot gas emerging from the nozzle. The fresh air is introduced in the form on the one hand of a peripheral layer surrounding the hot gas and on the other hand as a central flow injected into the hot gas plume, and finally as blades of air of angular sector form spread around the circumference and alternating with blades of hot gas, likewise as angular sectors. The hot gases, thus diluted and cooled with the ambient air, are injected into the plume diverter which is formed from its inlet to its outlet by an initial mixing section, converging, the cross-section of which progresses smoothly from a circular inlet to a substantially rectangular outlet, to an intermediate acceleration section which is elbowed and slightly convergent and then to a diffusing outlet section which is divergent, the intermediate and outlet sections having a substantially rectangular cross-section the largest dimension of which extends in the transverse direction. The injection into the plume diverter of the mixture of hot gas and of ambient air which emerges from the ejector assembly involves the aspiration, via the annular passage defined between the circular outlet of the ejector assembly and the circular inlet of the plume diverter, of a supplementary volume of ambient air which further again increases the dilution of the gaseous mixture and lowers its temperature. The rear upturned wall of the dog-leg plume diverter prevents any direct view from the rear and from the outlet of the diverter onto the hot parts at the exit of the gas turbine nozzle or at the entry to the ejector assembly. Furthermore the plume diverter is surrounded by a tubular thermal insulating covering. Internal diverting vanes which are streamlined and curved around a transverse axis parallel to the axis of curvature of the dog-leg section of the diverter, are mounted in this dog-leg section with the object of making it easier to obtain non-turbulent flow. Finally cooling means are integral with the walls of the jet diverter and these comprise slots provided in these walls and forming ejectors fed via channels defined by panels on the external face of the walls in such a fashion that the corresponding parts of the external face of the walls are swept over and cooled by flows of ambient air and layers substantially parallel to the central flow.

This construction, in contrast to the preceding one, does not comprise elements which are continuously moving when working, but it does however have the disadvantage of being a complex construction which is heavy and costly, particularly at the level of the ejector assembly.

Another device for suppressing infra red radiation from the exhaust gas and the metal parts which are heated up by a gas turbine engine is described in French published Patent Application No: 2508412 (U.S. Pat. No. 4,312,480). This device comprises from its entry to its exit a primary injection nozzle for hot gas and a dilution assembly which is also a diverter for the plume and which is for secondary injection, which assembly is likewise cooled by the circulation of ambient air. The primary injection nozzle for the hot gas comprises an initial section which constitutes a collector nozzle for the hot exhaust gases from the turbine engine the cross-section of which merges progressively from a circular entry to a substantially rectangular exit and a downstream section which is a prolongation of the upstream section and which is constituted by several injector nozzles of substantially rectangular section each of which debouches at its downstream end into the entry of a dog-leg duct of the dilution assembly which diverts the plume and which carries out secondary injection, defining with this entry a peripheral annular passage through which a primary flow of ambient air is aspirated by means of the injection of hot gas into the corresponding elbowed duct. In each of these various dog-leg or elbowed ducts, which are all arranged in the interior of an external cover which is likewise of dog-leg or elbowed shape, there is thus produced a dilution of the hot gas with air from a primary ambient air flow, then a diversion of the plume of gaseous mixture, while simultaneously the wall of each of the elbow or dog-leg ducts is cooled by the circulation of a secondary ambient air flow in confined channels on the inside of the external envelope and on the outside of the elbow or dog-leg ducts and between these latters, this secondary flux of ambient air being likewise aspirated by the suction effect as a result of the flow of the plumes of gaseous mixture in the elbowed ducts. According to a particular construction, the elbowed portion and the downstream part of each elbowed duct are separated from the corresponding portions of the neighbouring duct or ducts by a deflector plate which extends in the interior of the external envelope beyond the downstream ends of the elbow ducts in such a way that the secondary flow of ambient air, which penetrates into the external envelope at the level and around the upstream ends of the elbow ducts and circulates in the same direction as the plume of gaseous mixture in the elbow ducts, is split by the deflector plates into currents each of which comes to dilute the jet of gaseous mixture emerging from one of the elbow ducts in accordance with secondary injection. According to other particular embodiments the secondary flux of ambient air penetrates into the external envelope substantially at the level of and around the downstream ends of the elbow ducts and circulates in the opposite direction relative to the plume of gaseous mixture guided through the elbow ducts up to the upstream ends of these latter at the level of which diverter elements direct the flux of the secondary flow towards the entry of the elbow ducts and in the same sense of flow as the hot gases emerging from the injector nozzles and so that the primary flow penetrates into the elbowed ducts. In the embodiments of this type the primary and secondary ambient air flows are both mixed via the entry of the elbow ducts with the hot gas emerging from the injector nozzles.

The embodiments described in French Specification 2508412 (U.S. Pat. No. 4,312,480) are effectively suitable for equipping turbine engines in helicopters with lateral exhaust and which are located before the main transmission box of the helicopter in a casing or housing which constitutes an integral part of the fuselage, but these constructions have as a common disadvantage the fact that the structure of the assembly which dilutes and diverts the plume and carries out secondary injection, which is cooled on its exterior by the circulation of fresh ambient air through double walls, is complex, heavy and costly, and as a result is only appropriate to installation in large tonnage helicopters.

OBJECTS OF THE INVENTION

The object of the present invention is to provide a diluter, diverter assembly for the plume from a gas turbine engine of a helicopter with lateral exhaust which should have a simple and effective structure which is relatively less heavy, economic to manufacture and which operates to an extent where it does not constitute a disadvantage in terms of the various maintenance operations which need to be carried out under the fuselage casing on which the assembly of the diluter and diverter for the plume is mounted.

Another object of the invention is to provide a diluter and diverter structure for the plume which can be mounted on helicopters which have not initially been designed to be equipped with such an assembly.

Another object of the invention is likewise to provide a diluter diverter assembly for the plume which can be realised in the most appropriate fashion in order to present the least aerodynamic drag during the phases of flight during which the helicopter is not threatened and does not necessitate protection against infra red radiation.

BRIEF DESCRIPTION OF THE INVENTION

For this purpose, the plume diluter diverter assembly in accordance with the invention which is designed to cooperate with a turbine engine of a heavier than air machine with lateral exhaust and which is located under a housing which constitutes an integral part of the fuselage of the heavier than air machine, is of a type comprising:
an injection nozzle itself comprising
  - an upstream section constituting a collector nozzle for hot exhaust gases from the turbine engine, the cross-section of which changes progressively from a substantially circular entry portion centred on the axis of the turbine of the turbine engine to a substantially rectangular outlet the principal dimension of which is vertical and
  - a downstream section which is a prolongation of the upstream section and which forms at least two injection nozzles of substantially rectangular cross-section the principal dimension of which is vertical and
a body for diluting and diverting. the plume into which the exit of the injection nozzles debouches and which is fed by the suction effect with fresh ambient air which dilutes the hot gases and reduces their temperature, the outlet of the body being defined by the downstream end of an elbow or dog-leg section which masks the nozzle from behind and which diverts the plume of gaseous mixture circulating in the body, and wherein:

the injection nozzle has a lateral S-shape double elbow, the collector nozzle being located inside the housing of the turbine engine and elbowed in such a fashion that its outlet opens to the outside of this housing, and the injection nozzles being on the exterior of the housing of the turbine engine and elbowed in such a fashion that the flow of hot gas at their exit is substantially parallel to the axis of the turbine of the turbine engine, but offset laterally with reference to that axis, and the dilution and diverter body comprises, from its upstream towards its downstream end,

- a mixer of substantially rectangular cross-section, the principal dimension of which is vertical, into the entry of which debouches the outlet of the injection nozzles and which is disposed laterally in the prolongation of the injection nozzles, this mixer being fed with ambient air aspirated via a principal fresh air inlet located substantially directly at the connection between the collector nozzle and the injection nozzles and bounded on its outer side by a front section faired into a casing laterally masking the injection nozzles and the mixer and on its inside by an internal faired screen masking the injection nozzle laterally and from in front and
- the elbowed section directed upwardly and of substantially rectangular cross-section the principal dimension of which is vertical and into the entry of which the exit from the mixer opens.

Thus the diluter diverter assembly for the plume has a relative arrangement of its different elements which, on the one hand, ensures the dilution of the exhaust gas and on the other hand masks off the hot parts to the maximum degree.

Advantageously the mixer comprises at least one deflector plate internally arranged longitudinally substantially vertically which subdivides the flow of the gaseous mixture passing through the mixer and which enables the rate of dilution to be substantially increased.

With the object of ensuring improved attenuation of the infra red radiation emitted, the external wall of the mixer is advantageously heat insulating and the faired casing is preferably hollow and is constituted by and/or filled with a thermally insulating material.

Furthermore, part of the ambient air aspirated through the principal fresh air entry passes between the mixer and the faired casing which covers it laterally in such a fashion that the lateral transfer of heat between the walls of the mixer and of the masking casing is minimised.

With the object of diminishing as much as possible the power losses due to the elbow in the plume diverter, in such a way as to obtain a sufficient rate of dilution, at least one transverse deflector which is elbowed in the same sense as the elbow section is mounted in the latter.

Advantageously the elbow section is mounted pivotally with respect to the mixer around a transverse and substantially horizontal hinge pin, so that it can be moved between two end positions, one of which is a position of maximum deflection upwardly of the plume of exhaust gas mixture passing through the mixer, a position in which the nozzle is masked when seen from behind, and the other of which is a position of minimum deviation in which the mixed gas plume is directed substantially towards the rear. In the case where the heavier than air machine is a helicopter, the possibility is thus offered of reducing the angle of deflection of the plume when the helicopter is not being threatened and this promotes the following advantages: in stationary flight, the push directed towards the ground, because of the deflection of the jet, and which is deleterious for the performance of the helicopter, is reduced in the position of minimum deviation, while in translational flight the push forwards is augmented and this substantially diminishes or even cancels out the drag caused by the entry of fresh air in this same minimum deviation position. It should likewise be noted that in the maximum deviation position there is an unfavourable aerodynamic interaction between the gaseous mixture plume, the slip-stream of the plume diluter diverter assembly and the flow over the rear of the portion of fuselage on which this assembly is mounted, which increases the drag of the assembly and leads to an overall drag greater than the sum of the individual drags, while on the other hand in the position of minimum deviation the flow over the rear part of the fuselage which carries this assembly is blown by the gaseous mixture plume emerging from the plume diverter diluter assembly, which gives rise to a reduction in overall drag.

Preferably the internally faired screen is connected to a central plug fixed against the casing of the turbine engine upstream of the connection of the collector nozzle to the injection nozzles and defining with the front faired section of the casing masking the mixer a main entry for semi-dynamic air. The advantages connected with semi-dynamic air entry with a central plug are on the one hand a reduction of the drag thanks to the limitation of the recovery of dynamic pressure which, diminishing the dilution rate, reduces the air brake effect at the outlet of the diluter and, on the other hand, masking the injection nozzle and the mixer in order to prevent any direct view on these two elements whatever the angle, thanks to the geometrical combination of the internally faired screen, of the central plug and of the fairing of the lateral masking.

Advantageously the collector nozzle is fixed to the turbine engine while the injection nozzles, the faired casing, the faired screen and if used the central plug are fixed to the body of the plume diluter diverter which is independent of the structure of the heavier than air machine itself and mounted detachably on the fuselage of the latter in such a fashion that a plume diluter diverter assembly according to the invention can accordingly be fitted as equipment on heavier than air machines not originally designed to take this equipment of a military nature.

In one simple and practical embodiment the diluter diverter body is hinged by its upper part on two hinges about an axis which is substantially horizontal and fixed to a part of the fuselage of the heavier than air machine, the diluter diverter body being boltable into its use position via its lower part on the structure of the fuselage with the aid of removable shafts and being liftable into a position giving access to the casing of the fuselage on which it is mounted and can be kept in the elevated position by means of at least one hydraulic strut.

In this latter case it is advantageous if the connection between the collector nozzle and the injection nozzles, in the use position of the diluter diverter body, is ensured by a floating ring having a portion of "U" section engaged on a peripheral entry flange of the injection nozzles, with which the floating ring is engaged, the wing of that part of the "U" on the side remote from the nozzles being prolonged by a blade substantially perpendicular to the peripheral flange, and which is curved back along its free edge towards the base of the "U", so that this floating ring centers itself automatically on the collector nozzle assuring the sealing of the connection by the interaction of the wing of the floating ring on a peripheral flange of the exit of the collector nozzle. Such a floating ring thus ensures a connection without mechanical effort between the two sections of the injection nozzle and it permits motion in all directions compatible with the vibrations and the displacements which are normal with a turbine engine when it is running.

DESCRIPTION OF PREFERRED EMBODIMENTS

Figure 1:
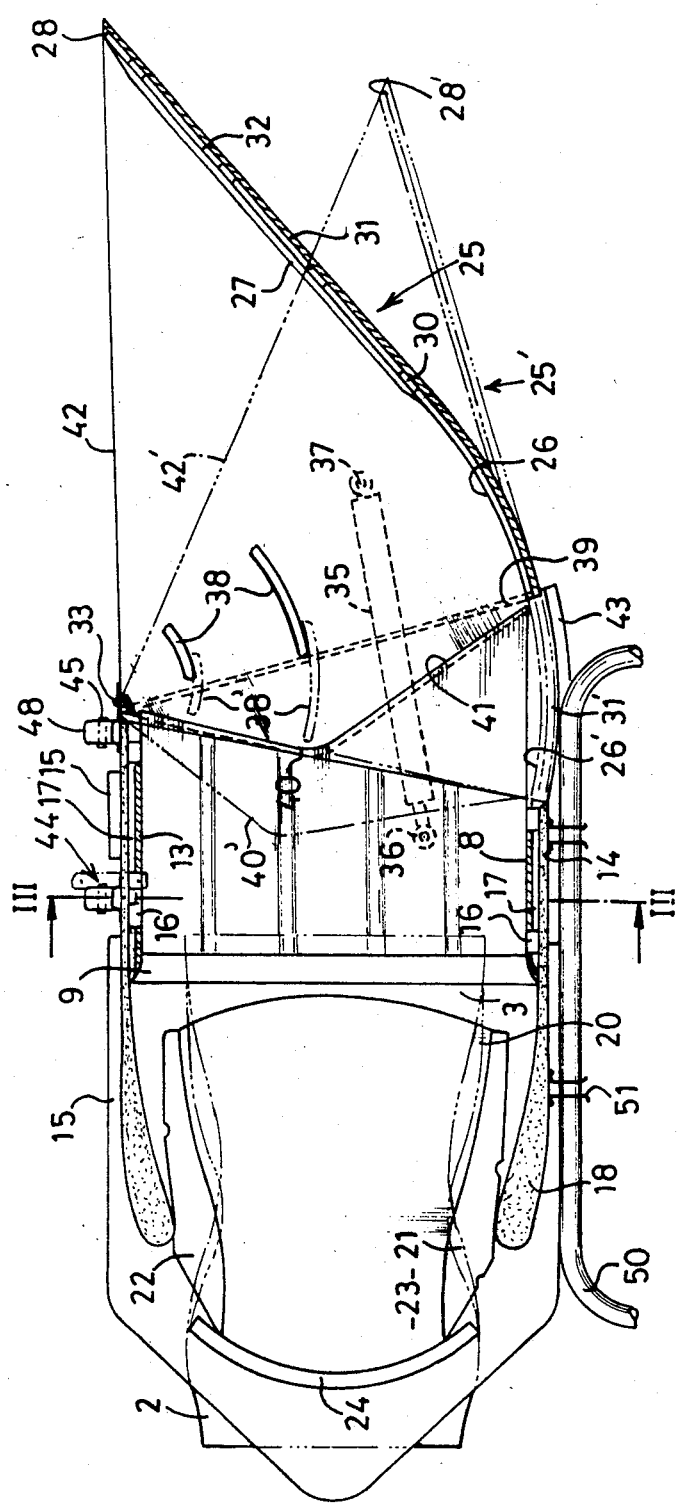

The invention will be better understood by considering one particular specific embodiment which will be described below, as a non limitative example, with reference to the accompanying drawings, in which:

FIG. 1 shows schematically, partly in axial section and partly in lateral elevation, a plume diluter diverter assembly for a helicopter with gas turbine engines, FIG. 2 shows schematically the assembly of FIG. 1 in a horizontal section through an axial plane, FIG. 3 shows schematically the assembly of FIGS. 1 and 2 in a transverse vertical section along the lines III—III of FIG. 1 and FIG. 4 is a schematic view in section of the joint between two elements of the assembly of FIGS. 1 to 3.

With reference to FIGS. 1 to 4 the plume diluter diverter assembly comprises an injection nozzle 1 having a lateral double elbow, substantially of an "S" shape, and constituted by the combination of a collector nozzle 2 and of an injector subdivided into two injection nozzles 3. The collector nozzle 2 is mounted at the rear of the turbine of a gas turbine engine (not shown) with lateral exhaust protected underneath an engine casing of the fuselage of the helicopter, in front of the main transmission box of this latter. The collector nozzle 2 is accordingly mounted at the position of the basic nozzle of the turbine engine in the interior of the housing 60 of the engine. This nozzle 2 which receives the hot gases emerging from the turbine engine, has an inlet 4 of cross-section substantially circular centered on the axis A of the turbine, and which evolves progressively to a section which is essentially rectangular at its exit 5, which opens laterally towards the exterior of the fuselage and opens into the interior of the entry 6 of the injection nozzles 3. Seen in plan, nozzle 2 has the form of an elbow at a lateral angle of about 60° with reference to the axis of the turbine A. The connection between the outlet 5 from nozzle 2 and the entry 6 to the nozzles 3 is constituted by a floating ring described below with reference to FIG. 4. The two nozzles 3 have a common rectangular entry 6, starting from which they are separated and offset laterally one relative to the other. Both have a substantially rectangular cross-section the greater dimension of which is vertical and are both elbowed substantially at 60° towards the rear of the helicopter. The outlets 7 of the two nozzles 3 debouch in the same plane vertically and transversely with respect to the longitudinal axis of the helicopter in such a fashion that the two gas flows which exhaust from exits 7, which result from the division of the flow consolidated in the turbine 2, are directed towards the rear of the helicopter substantially parallel to the axis A of the turbine of the turbine engine but offset laterally with respect to this axis. As a result of the shape of the section of nozzles 3, the two jets which emerge from these latter have very elongated shape in the vertical direction. The exits 7 of nozzles 3 open into the entry section 9 of a mixer 8 of rectangular section with rounded corners the greater dimension of which is likewise vertical and the central passage of which is subdivided into two equal parallel passages disposed laterally side by side, the division being by means of a vertical longitudinally running central internal plate 10 which extends from the entry section 9 of the mixer 8 up to near the outlet 11 of the mixer 8. The entry section 9 is shaped as a convergent passage with the object of better channeling the flow of ambient air aspirated into the annular space defined between the internal wall of the entry 9 and the external wall of the nozzles 3 toward the interior of the mixer 8 by a suction or venturi effect using part of the residual kinetic energy of the exhaust gases from the turbine engine. This fresh air is provided from the outside via a principal feed entry, described below, as well as to a limited extent from inside the casing of the turbine engine. The division of the outlet flow from nozzle 2 into two jets and the vertical elongation of these jets in the nozzles 3, have the effect of increasing the contact perimeter between the flow of exhaust gas and the aspirated air over a given surface section. In the mixer 8 the temperature of the hot exhaust gases, essentially carbon dioxide and water vapour, is reduced and the concentration of this exhaust is diminished by dilution with the aspirated fresh air, and the central plate 10 substantially increases the dilution rate. The walls of the mixer 8 which, as in the case of central plate 10, are rendered rigid by longitudinal ribs such as 12, effected by deformation, are surrounded by an external heat insulating lining 13 which limits infra red emission. The mixer 8, located laterally with respect to the fuselage of the helicopter, is likewise masked laterally towards the top and downwardly by means of a hollow fairing 14 made of a poorly heat conductive material or from sheet metal and filled with a poorly heat conductive material. This fairing 14 constitutes with an internal casing 15, in the form of a vertical plate of the same nature and by means of which it is supported, the framework of a diluter body to which the mixer 8 is fixed via supports such as 16 in the form of a U-shape with wings flanged to the outside of the legs of the "U" at their free ends in such a fashion that there is located a free space 17 between the internal wall of the fairing 14 and the heat insulating lining 13. Part of the quantity of fresh air aspirated circulates in this space 17 in such a fashion that the transfer of heat between the mixer 8 and the fairing 14 is minimised. The fairing 14 is extended forwardly by means of a section 18 which is streamlined both inside and outside and which defines the outside of a principal air entry 19 which feeds the mixer 8 and which is located substantially at the connection between the nozzle 2 and the nozzles 3. This principal air entry 19 is directed towards the front with the object of taking advantage of dynamic pressure when the helicopter is moving along at high speed, and it is defined internally by means of a faired screen 20 which is fixed by lower portion 21 and upper portion 22 against the forward portion of casing 15, while its principal central portion surrounds on the exterior the two nozzles 3 masking them laterally and towards the front as well as masking nozzle 2. It is necessary to observe that the nozzles 3 are likewise masked laterally by means of the front section 18 of the fairing 14. The internal wall of this front section 18 is shaped so that it is divergent, but it cooperates with the bulged surface of screen 20 in such a fashion that the main entry 19 is slightly convergent, these shapes working together to limit the power losses undergone by the current of air aspirated in stationary flight of the helicopter. The central portion of the screen 20 is extended towards the front beyond the connection of the nozzle 2 to the nozzles 3 by means of a central plug 23, the front end 24 of which is rounded and projects laterally extending towards the outside. Thanks to this central plug 23, which masks towards the front nozzle 2 and the nozzles 3, and which furthermore promotes aspiration of air to the interior of the motor casing, there is obtained a semi-dynamic type of main air entry 19. Such an entry 19 has the advantages of reducing drag by limiting the build up of dynamic pressure which, while diminishing the rate of dilution, reduces the air brake effect at the outlet of the dilution assembly, and of masking nozzle 2, nozzles 3 and the mixer 8 in such a fashion as to prevent any direct view of these elements either from in front or laterally, whatever the angle of observation, thanks to the geometrical combination ensured by means of faired screen 20, the central plug 23 and the fairing 14. The screen 20 and the central plug 23 as well as the front section 18 of the fairing 14 are cooled by the fresh air which circulates along their walls. The outlet of the mixer 8 opens into the entry of a plume diverter 25 in the shape of an elbow of rectangular transverse section and directed upwardly. This plume diverter 25 comprises an internal wall 26 the lower rear portion of which is rendered more rigid by means of longitudinal ribs 27 effected by deformation in the flat section which terminates at the level of the rear free edge 28 and the lateral vertical portions of which are rendered more rigid by inclined ribs 29, likewise formed by deformation. By means of U-shaped supports 30 with wings flanged outwardly, the internal wall 26 is fixed with a certain internal free space 32 to the interior of an external shell 31 of corresponding shape. By means of the forward upper end of these lateral vertical portions, the elbow section 25 is mounted pivotally around a hinge pin 33 which runs transversely and substantially horizontally on two lateral elements of the framework 34 one fixed to the rear portion of casing 15 and the other to the rear portion of fairing 14. The pivoting of the elbow 25 with respect to the mixer 8 is effected by means of a position actuator schematically drawn in dashed lines as 35 on FIG. 1, the front end of which is pivoted at 36 to one side of the mixer 8 while its rear end is pivoted to the same side at 37 on the elbow 25. Two deflector plates 38 (only one of which is shown in FIG. 3) which run transversely and which are elbowed in the same sense and about the same centre of curvature as the elbow 25 are mounted between the lateral portions of the internal wall 26 with the object of reducing power losses due to the elbow in such a fashion as to give a sufficient dilution rate. The front edge of these plates 38 is near the front straight edges 39 of the lateral portions of the external shell 31, while the front edges of the lateral portions of the internal wall 26 have the shape of a projection of V-shape 40, which is directed towards the mixer 8, the lateral portions of which have at their rear end a shape as a "V" cut-out 41 of corresponding shape. The operations of the actuator 35 thus permit the elbow 25 to be made to pivot between two end positions, one of which represented in full lines in FIG. 1 is the position of maximum deviation upwardly of the plume exhausting from elbow 25. In this position the rear upper edge 28 and the upper side edges 42 which are substantially horizontal are disposed in such a fashion that through the outlet of the jet plume diverter, an observer located at any point behind and at the same altitude as the helicopter, in its normal position of stationary flight, cannot see the internal walls of mixer 8. Furthermore, nozzles 3 and nozzle 2 are likewise masked towards the rear. In this position of maximum deflection upwardly the forward projecting V-shapes 40 of the elbow 25 laterally close the "V" cut-outs 41 of the sides of the mixer 8. This upper position, which provides the best protection against infra red radiation detection, because the hot parts are masked to the maximum extent and the hot gas plume is well diluted, is that which should be adopted if the helicopter is threatened. In this configuration an unfavourable interaction develops between the plume emerging from the diluter diverger assembly, the slipstream from this assembly and the flow over the rear portion of the fuselage on which the assembly is mounted. This interaction increases the drag of the assembly and leads to an overall drag greater than the individual drags. During the course of phases of flight during which the helicopter is not threatened, the actuator 35 permits the elbow 25 to be lowered into a downward position or one of minimum plume deviation, the position of which is shown in dash-dot lines on FIG. 1, the various elements of elbow 25 then adopting a position denoted by the same reference numerals as above but each identified with the symbol '. The passage from the upper position to the lower position is obtained by pivoting the assembly of the elbow 25 about the hinge pin 33, that is to say towards mixer 8, the "V" projecting lateral walls 40 partially enveloping the exterior of the sides of mixer 8 and the lower portions of the internal wall 26 and of the external shell 31 overlapping in a cradle 43 of corresponding curvature and which is fixed to the framework of the plume diluter diverter assembly. In this lower position in which the plume emerging from the elbow 25 remains substantially directed upwardly but is nevertheless more directed towards the rear than in the upper position, the outlet of the plume of gaseous mixture ensures a blowing of the flow over the rear part of the fuselage on which the jet diluter diverter assembly is mounted in such a fashion that the overall drag is reduced. Other advantages connected with the adoption of this lower configuration are, in rapid translational flight of the helicopter, that the push towards the front is increased and this diminishes substantially or even cancels out the drag on account of the capture of fresh air, and in stationary flight the push downwardly due to the deflection of the jet and which is disadvantageous for the performance of the helicopter is accordingly reduced.

In this embodiment the nozzles 3, the screen 20 and the central plug 23, the fairing 14 and the pivoting outlet elbow 25 are fixed to the framework of the plume diluter diverter assembly and constitute a structural body independent from that of the fuselage but which is fixed at its upper internal portion by two hinges 44 with horizontal longitudinal pins 45 onto a part of the fuselage which is for example a housing 46 sliding towards the rear. On this housing 46 there are fixed the immobile and central portions 47 of hinges 44 while the pivoting outer portions 48 of the hinges 44 are fixed to the upper wall of the fairing 14. In the use position of this plume diluter diverter assembly, which is mounted removably from the helicopter, the articulated body is bolted by its lower portion to the structure of the fuselage by means of removable shafts (not shown) engaged in eye pieces 49 screwed into the two curved down ends of a longitudinal bow 50 which is mounted by means of two transverse triangular attachment plates 51 fixed on the fairing 14.

The opening of sliding housing 46 which for example is a housing for access to the rear of the turbine engine, is obtained by the following sequence of operations: the fixings 49 are unbolted from the structure of the fuselage by pulling out the removable pins, then the plume diluter diverter assembly is lifted up by pivoting upwardly around the pins 45 of hinges 44 and it is kept in the elevated position with the aid of hydraulic props of which one upper end attachment portion is fixed to a transverse plate 51, schematically as shown at 52 on FIG. 3. An opening handle (not shown) for the sliding casing 46 is then accessible and the casing can be moved towards the rear. The reverse sequence permits the plume diluter diverter assembly to be brought back into its use position. When the latter is regained, the connection between the nozzle 2 and the nozzles 3 is ensured in a relatively gas sealed fashion by automatic centering around the exit 5 of the nozzle 2 which remains permanently attached to the turbine engine by means of a floating ring 53 which is schematically shown in section in FIG. 4.

This floating ring 53 comprises a U-shaped portion 54 into which is engaged a peripheral flange 55 carried by the upstream out-turned end 56 which defines the entry 6 for the nozzles 3. One wing of the U-shaped portion 54 is longer than the other and is laterally prolonged towards the outside of the "U" 54, essentially perpendicular to the flange 55 by means of a wing 57 the free edge of which 58 is slightly turned back down towards the base of the "U" 54. When the nozzles 3 are moved back towards nozzle 2 by pivoting the plume diluter diverter assembly towards its use position, the floating ring 53 which is connected to the forward end 56 of nozzles 3 comes automatically to position itself by means of its wing 57 against a peripheral bead 59 of folded back metal in the shape of a "U" around the downstream end of the wall of the nozzle 2. The floating ring 53 thus ensures a connection without mechanical fixture between the nozzle 2 and the nozzles 3 and it permits all of the displacements in all directions which arise due to the normal vibrations and displacements of the turbine engine.

In this embodiment all of the pieces with the exception of the heat insulating materials are metallic and rigid and are resistant to the high temperatures of the exhaust gases and the hot walls contacted by these gases are all well masked, when the elbow 25 is in its upper position.

It should be noted that the movement actuator 35 can, if one desires, be left out and the elbow 25 fixed in its upper position if one desires to ensure maximum permanent protection for the helicopter.

I claim:

1. A plume diluter diverter assembly for a turbine engine of a heavier than air machine, said machine including a fuselage having a housing, said turbine engine being positioned in said housing and having a turbine and a turbine axis, said plume diluter diverter assembly comprising:
    a plume diluter diverter body, and
    a collector-injector means for collecting hot exhaust gases from the turbine engine and injecting the exhuast gases into said body;
    said collector-injector means comprising
        an upstream section defining a collector nozzle for the exhaust gases having a cross section which deforms progressively from a substantially circular inlet centered on said turbine axis to a substantially rectangular outlet having a vertical height and a lateral width, said height of said rectangular outlet being greater than said width, and
        a downstream section extending from said rectangular outlet and splitting into at least two injecton nozzles of substantially rectangular cross section, each having an outlet, said at least two injection nozzles being positioned laterally of each other,
    said collector-injector means being formed as a laterally extending S-shaped member with said collector nozzle being positioned inside said housing and elbowed such that said rectangular outlet opens towards the outside of said housing and said injeciton nozzles being positioned outside said housing laterally adjacent thereto and elbowed such that said outlets of said injection nozzles direct the flow of hot exhaust gases in a direction substantially parallel to said turbine axis laterally offset from said turbine axis;
    said plume diluter diverter body comprising
        a casing, said injection nozzles being positioned in said casing, said casing having a principal fresh air entry portion located substantially level with said collector-injector means and defined on its outside by a faired forward section laterally covering said at least two injection nozzles and on its interior by an internal faired screen masking said at least two injection nozzles to the front and side,
        a mixer positioned in said casing laterally covered by said faired forward section and having a substantially rectangular cross section with a vertical height and lateral width, said height of said mixer being greater than said width of said mixer, said outlets of said injection nozzles debouching in an entry portion of said mixer, said mixer being fed with ambient fresh air aspirated by suction effect through said fresh air entry portion of said casing which dilutes the hot exhaust gases and lowers the temperature thereof, and
        an elbow section attached to said casing at a downstream outlet end of said mixer, said elbow section being directed upwardly and having a substantially rectangular cross section with a height and a width, said height of said elbow section being greater than said width, said elbow section masking said mixer and said injection nozzles from view from behind and diverting a plume of gaseous mixture from said mixer.

2. The plume diluter diverter assembly of claim 1 wherein the mixer further comprises at least one deflector plate which is internal and runs longitudinally, is substantially vertical, and which subdivides the flow of the gaseous mixture passing through the mixer.

3. The plume diluter diverter assembly of claim 1 wherein the exterior wall of the mixer is heat insulated.

4. The plume diluter diverter assembly of claim 1 wherein a part of the ambient air aspirated passes between the mixer and the casing which masks it laterally.

5. The plume diluter diverter assembly of claim 1 wherein the casing is hollow and is made of a thermal insulating material.

6. The plume diluter diverter assembly of claim 1 and including at least one transverse deflector which is elbowed in the same sense as the elbowed section and which is mounted in the latter.

7. The plume diluter diverter assembly of claim 1, further including a hinge mounting enabling the elbowed section to be mounted pivotally with respect to the mixer around a hinge axis which runs transversely and substantially horizontally, enabling the section to move between two end positions one of which is a position of maximum deviation upwards of the plume of gaseous mixture passing from the mixer, and in which the injection nozzles are completely masked from behind, and the other of which is a position of minimum deviation, in which the plume of gaseous mixture is directed substantially towards the rear.

8. The plume diluter diverter assembly of claim 1 and including a central plug to which the internal faired screen is attached and which is attached against an inner casing portion upstream of the connection of the collector nozzle to the injection nozzles and which defines, with the faired forward section of the casing which masks the mixer, a semi dynamic principal air inlet.

9. The plume diluter diverter assembly of claim 8 wherein the collector nozzle is fixed to the turbine engine, and the downstream section of the collector-injector means and the plume diluter diverter body are independent of the structure of the heavier than air machine and are mounted removably on the fuselage thereof.

10. The plume diluter diverter assembly of claim 9 wherein the plume diluter diverter body is pivoted at its upper portion on two hinges about an axis which is substantially horizontal and runs longitudinally, said hinges being attached to the fuselage of the heavier than air machine, the plume diluter diverter body being bolted into its use position at its lower portion onto the structure of the fuselage with the aid of removable pins.

11. The plume diluter diverter assembly of claim 10 wherein the plume diluter diverter body can be lifted up into a position giving access to the fuselage portion on which it is mounted and is arranged to be maintained in the upward position by means of at least one hydraulic strut attachable thereto.

12. The plume diluter diverter assembly of claim 9 wherein the connection between the collector nozzle and the injection nozzles in the position of the use of the plume diluter diverter body is ensured via a floating ring which has a U-section portion engaged on a peripheral flange on the entry for the injection nozzles, to which the floating ring is fixed, the wing of that part of the "U" on the side opposite the nozzles being prolonged by a blade substantially perpendicular to the peripheral flange and curved back along its free edge towards the base of the "U", the floating ring centering itself automatically on the collector nozzle in order to ensure sealing by the abutment of the wing of the floating ring on a peripheral bead on the outside of the outlet of the collector nozzle.

13. The plume diluter diverter assembly of claim 1, wherien the collector nozzle is fixed to the turbine engine, and the downstream section of the collector-injector means and the plume diluter diverter body are independent of the structure of the heavier than air machine and are mounted removably on the fuselage thereof.

14. The plume diluter diverter assembly of claim 1 wherein the casing is hollow and is lined with a thermal insulating material.

* * * * *